United States Patent
Lou et al.

(10) Patent No.: US 6,842,724 B1
(45) Date of Patent: Jan. 11, 2005

(54) METHOD AND APPARATUS FOR REDUCING START-UP DELAY IN DATA PACKET-BASED NETWORK STREAMING APPLICATIONS

(75) Inventors: Hui-Ling Lou, Murray Hill, NJ (US); Gerald Dietrich Thomas Schuller, Chatham, NJ (US); Vijitha Weerackody, Watchung, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 591 days.

(21) Appl. No.: 09/288,833

(22) Filed: Apr. 8, 1999

(51) Int. Cl.$^7$ ................................................ G06G 7/48

(52) U.S. Cl. .................................... 703/6; 348/172

(58) Field of Search ......................... 382/251, 236, 382/248, 232; 370/352, 400, 427, 380, 353; 375/371, 240.16, 260; 704/500, 230; 713/201

(56) References Cited

U.S. PATENT DOCUMENTS

| | | | | |
|---|---|---|---|---|
| 4,920,534 A | * | 4/1990 | Adelmann et al. | 370/474 |
| 6,108,626 A | * | 8/2000 | Cellario et al. | 704/230 |
| 6,345,125 B2 | * | 2/2002 | Goyal et al. | 382/251 |
| 6,349,152 B1 | * | 2/2002 | Chaddha | 382/253 |
| 6,351,474 B1 | * | 2/2002 | Robinett et al. | 375/371 |
| 6,351,730 B2 | * | 2/2002 | Chen | 704/229 |
| 6,356,665 B1 | * | 3/2002 | Lei et al. | 382/240 |
| 6,366,704 B1 | * | 4/2002 | Ribas-Corbera et al. | 382/239 |

FOREIGN PATENT DOCUMENTS

| | | | | |
|---|---|---|---|---|
| EP | 0 695 094 A2 | | 1/1996 | H04N/7/26 |
| EP | 0695094 A2 | * | 1/1996 | H04N/7/26 |

OTHER PUBLICATIONS

Orchard et al., "Redundancy rate–Distortion Analysis of multiple description coding using pairwise correlating transforms", IEEE, Proceedings of the International Conference on Image Processing, Oct. 1997.*

Chaddah et al., "A frame–work for live multicast of video streams over the internet", IEEE, 1996.*

Lau et al., "Receive buffer control for variable bit–rate real time video", IEEE 1992.*

European Patent Office Search Report, Application No. 00302558.2–2216, The Hague, Aug. 2, 2000.

T. Chiang et al., "Hierarchical Coding of Digital Television", IEEE Communications Magazine, New York, May, 1994, pp. 38–45.

N. Chaddha et al., "A Frame–work for Live Multicast of Video Streams over the Internet", Stanford, CA., IEEE, 1996, pp. 1–4.

* cited by examiner

*Primary Examiner*—Kevin J. Teska
*Assistant Examiner*—Kandasamy Thangavelu
(74) *Attorney, Agent, or Firm*—Kenneth M. Brown

(57) ABSTRACT

A method and apparatus which reduces the start-up delay that may occur when switching programs in audio and/or video streaming applications while maintaining high quality steady-state performance thereof. A program source (e.g., an audio and/or video data stream) is encoded and transmitted as two or more separate bit streams (e.g., sequences of data packets), the transmission of one of these bit streams being delayed by a given amount of time relative to the transmission of the other bit stream(s). At the receiving end of the transmission channel, the two or more bit streams are buffered by receive buffers having different sizes (thereby resulting in different time delays when the contents thereof are decoded), wherein the time delay difference corresponds (inversely) to the relative delay times prior to transmission. Advantageously, either a multiple descriptive source coding scheme or an embedded coding scheme may be employed, in which at least one of the individual bit streams is sufficient to obtain a satisfactory decoded signal, but wherein the addition of the other bit stream(s) will improve the quality of the decoded signal. Alternatively, the data streams may comprise multiple encodings of the program source having different bit rates, wherein the lower bit rate encodings are transmitted with the correspondingly larger delays.

20 Claims, 1 Drawing Sheet

US 6,842,724 B1

METHOD AND APPARATUS FOR REDUCING START-UP DELAY IN DATA PACKET-BASED NETWORK STREAMING APPLICATIONS

FIELD OF THE INVENTION

The present invention relates generally to audio and video streaming applications employed in data packet-based networks such as, for example, the Internet, and more particularly to the buffering of received data packets which is typically performed in such applications.

BACKGROUND OF THE INVENTION

Internet applications that employ audio and video streaming are becoming increasingly prevalent. (When used herein, the term "audio" will be intended to include speech as one example of an audio signal.) As a natural consequence of transmitting and receiving data over a data packet-based network such as the Internet, when network traffic is large the network gives rise to relatively large packet delays. In particular, packet delays usually vary considerably depending on the momentary level of network congestion. Moreover, data packets are sometimes even lost completely by the network. Since applications which employ audio and video streaming are typically used in non-interactive environments, however, the end-to-end delay is usually not critical.

For these reasons, and as is totally familiar to those of ordinary skill in the art, data packets from such streaming applications are usually buffered at the receiving end over a time period which may typically be several seconds in duration. This buffering helps to reduce the detrimental effects of the relatively large and variable packet delays which result from the varying levels of network congestion. Packet losses in the network are typically addressed by using a forward error correction code across the packets, as is also fully familiar to those skilled in the art. The error correction capability of such an error correcting code typically improves with the size of the data packets.

Clearly then, a large receive buffer is highly desirable to provide a better quality signal, because it increases the probability that most of the transmitted packets representing data within the given (i.e. the buffered) period of time will have been successfully accumulated in the buffer before it is necessary to decode them for "playback." However, since the receive buffer usually needs to be initially filled before the signal can be decoded, a large buffer necessarily gives rise to a correspondingly large buffering delay, and, in particular, a large start-up delay. Start-up delays of a few seconds can be quite annoying, especially when a channel switch is made in an Internet broadcast environment. Such an environment typically involves an Internet backbone which broadcasts many independent programs, and a number of users which receive their individually selected program via a server connected to the backbone. A large start-up delay could thus be quite bothersome when a user changes the selected broadcast program. It would be highly desirable, therefore, to provide a source coding and receive data buffering scheme which results in more acceptable start-up delays without sacrificing the benefits of using a large receive buffer. In this manner, relatively painless channel switches may be effectuated while still maintaining high quality steady-state performance.

SUMMARY OF THE INVENTION

In accordance with the principles of the present invention, a novel technique is disclosed whereby the start-up delay that may occur when initiating or switching received programs in audio (including speech) or video streaming applications is advantageously reduced while maintaining high quality steady-state performance thereof. Specifically, the instant invention comprises a method and apparatus for processing two or more sequences of data packets received from a network, each of the sequences of data packets representing a common program source, in which a reproduction of the program source is generated by (a) buffering the data packets comprised in a first one of said sequences in a first receive buffer having a first buffering delay; (b) buffering the data packets comprised in a second one of said sequences in a second receive buffer having a second buffering delay, wherein the second buffering delay is smaller than the first buffering delay; (c) decoding the data packets buffered in the second receive buffer after the second buffering delay has elapsed; (d) decoding the data packets buffered in the first receive buffer after the first buffering delay has elapsed; and (e) generating the reproduction of the program source based at least upon the decoding of the data packets buffered in the second receive buffer before the first buffering delay has elapsed, and based at least upon the decoding of the data packets buffered in the first receive buffer after the first buffering delay has elapsed.

In accordance with an illustrative embodiment of the present invention, a program source (e.g., an audio and/or video data stream) is encoded and transmitted as two or more separate bit streams (e.g., sequences of data packets), wherein the transmission of one of these bit streams has been delayed prior to transmission by a given amount of time relative to the transmission of the other bit stream(s). At the receiving end, these two or more bit streams are buffered by receive buffers having different buffering delays (e.g., as a result of having different buffer sizes), wherein the time delay difference corresponds to the relative delay times effectuated between the bit streams prior to transmission.

In accordance with one illustrative embodiment of the present invention, it may be advantageous to employ a multiple descriptive source coding scheme, familiar to those skilled in the art. As is well known, in such a scheme, each of two or more individual bit streams are coded, each bit stream being sufficient by itself so that when it is decoded, a reproduction of the original program source having a satisfactory signal quality is obtained. However, when a combination of two or more of these individual bit streams is decoded, a reproduced signal of improved quality will result. (See, e.g., Michael T. Orchard et al., "Redundancy Rate-Distortion Analysis of Multiple Description Coding Using Pairwise Correlating Transforms," Proc. IEEE International Conference on Image Processing, October, 1997.) In this case, it is useful to transmit one of the individual bit streams as the "second" sequence of data packets, and either another one of the individual bit streams, or preferably, a combination of two or more of the individual bit streams as the "first" sequence of data packets. (Note that it will be obvious to those skilled in the art that for the efficient use of channel bandwidth, in any embodiment of the present invention for which it is desirable that the same data be included in multiple bit streams, that data can be advantageously transmitted as a part of only one of these bit streams, and then re-combined with the other(s) at the receive end of the channel, either before or after the corresponding decoding of the encoded bit stream data is performed.)

In accordance with another illustrative embodiment of the invention, it may be advantageous to employ an embedded coder, also familiar to those skilled in the art, in which a core layer and one or more enhancement layers are separately coded. (See, e.g., Jurgen Herre et al., "The Integrated Filterbank Based Scalable MPEG-4 Audio Coder," 105th Audio Engineering Society Convention, San Francisco, September, 1998.) In this case, it is useful to transmit the core layer bit stream as the "second" sequence of data packets, and a combination of the core layer bit stream and the enhancement layer(s) bit stream(s) as the "first" sequence of data packets. Again, the channel bandwidth efficiency "technique" described above can be advantageously employed. And also, in accordance with still another illustrative embodiment of the invention, the data streams may advantageously comprise multiple encodings of the program source each having a different bit rate, wherein lower bit rate encodings are transmitted with correspondingly larger delays (and thus buffered at the receiver with receive buffers having correspondingly shorter buffer delays).

DETAILED DESCRIPTION

Figure 1:
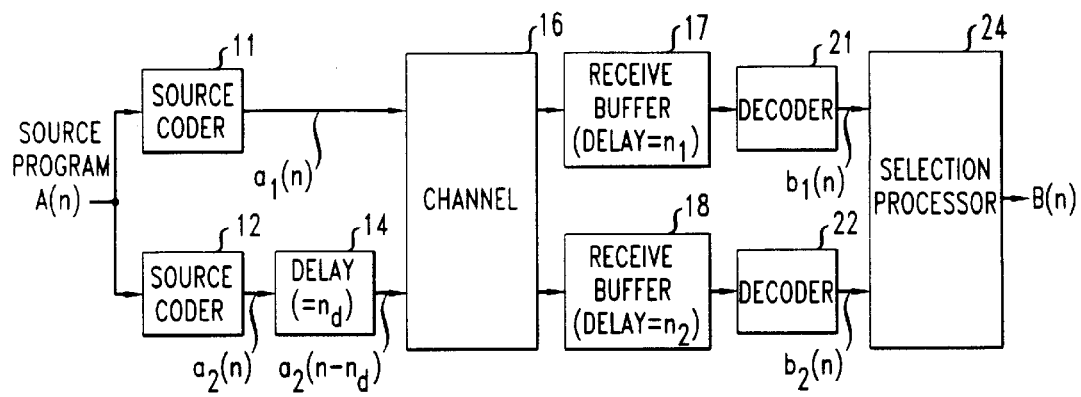
FIG. 1 shows a first illustrative environment for an audio or video streaming application in which the start-up delay for a given program broadcast may be advantageously reduced in accordance with an illustrative embodiment of the present invention.

FIG. 1 shows a first illustrative environment for an audio or video streaming application in which the start-up delay for a given program broadcast may be advantageously reduced in accordance with an illustrative embodiment of the present invention. In particular, the figure shows a program source, A(n), which is encoded by both source coder 11 and source coder 12 to produce two independent bit streams, $a_1(n)$ and $a_2(n)$, respectively. Each of these source coders may comprise any one of a number of conventional packet-based coders familiar to those of ordinary skill in the art, and as may be used for the coding of, for example, audio and/or video program data for transmission across a packet-based network such as, for example, the Internet.

Advantageously, the encodings performed by these two source coders are such that a reproduction of the original program source signal should be obtainable by decoding $a_2(n)$ only, and, preferably, such decoding should produce a signal of a reasonably acceptable quality. Moreover, a decoding of either $a_1(n)$ individually, or, alternatively, a combination of a decoding of each of $a_1(n)$ and $a_2(n)$, advantageously results in a reproduction of the original program source signal having a superior quality to that which is obtainable by decoding $a_2(n)$ only.

Specifically, in accordance with certain illustrative embodiments of the present invention, source coders 11 and 12 may advantageously implement one of a number of various coding schemes, each of which is familiar to those of ordinary skill in the art, designed to provide these advantageous characteristics. For example, it may be desirable to employ a multiple descriptive source coding scheme, in which each of two (or more) individual bit streams are coded and are sufficient by themselves to obtain a decoded signal having a satisfactory quality, but wherein the decoding of a combination of the two (or more) of these individual bit streams will result in a signal having improved quality as compared thereto. In this case, one of theses individual bit streams may be generated by source coder 12 and transmitted as signal $a_2(n)$, while the other one of these individual bit streams (or one of the other bit streams if there are more than two such individual bit streams) is generated by source coder 11 and transmitted as signal $a_1(n)$. At the receiving end of the transmission channel (see the discussion below), a combination of these two (or more) individual bit streams (the combination being effectuated either before or after the decoding process) can be used to produce the higher quality signal.

In accordance with another illustrative embodiment of the invention, it may be advantageous to employ an embedded coder, also familiar to those skilled in the art, in which a core layer and one (or more) enhancement layers are separately coded. In this case, the core layer is coded by source coder 12 and transmitted as signal $a_2(n)$, while the enhancement layer (or one of the enhancement layers if there is more than one such layer) is coded by source coder 11 and transmitted as signal $a_1(n)$. As above, at the receiving end of the transmission channel (see below), a combination of these two (or more) individual bit streams (combined either before or after decoding) can be used to produce the higher quality signal.

And also, in accordance with still another illustrative embodiment of the invention, the data streams may advantageously comprise multiple encodings of the program source each having a different bit rate. In this case, source coder 11 produces the encoding having the larger of the bit rates and transmits the resultant data stream as signal $a_1(n)$, whereas source coder 12 produces the encoding having the smaller of the bit rates and transmits the resultant data stream as signal $a_2(n)$.

In any case, and in accordance with the illustrative environment of FIG. 1, signal $a_2(n)$, as generated by source coder 12, is delayed prior to transmission (relative to the transmission of signal $a_1(n)$ as generated by source coder 11) by conventional delay element 14. The amount of delay which is applied, $n_d$, is advantageously approximately equal to the difference in the delays which are to be incurred by the receive buffers used at the receiver prior to the decoding of the two data streams, $a_1(n)$ and $a_2(n)$—see the discussion below. Thus, delay element 14 produces signal $a_2(n-n_d)$, namely, signal $a_2(n)$ delayed by an amount of time $n_d$. Channel 16 represents a communications channel adapted to the transmission of packet-based data streams such as, for example, the Internet. Alternatively, however, channel 16 may comprise any of a number of other possible communications channels, including (but not limited to), for example, a telecommunications network (such as, for example, a Local Exchange Carrier network or an Interexchange Carrier network), or a local or wide area computer network.

In accordance with the illustrative embodiment of FIG. 1, the receiving end of channel 16 comprises two receive buffers—receive buffer 17 and receive buffer 18. Receive buffer 17 is adapted to receive the data stream which was transmitted as $a_1(n)$, and receive buffer 18 is adapted to receive the data stream which was transmitted as $a_2(n)$. Receive buffer 17 has an associated buffer delay of $n_1$ and receive buffer 18 has an associated buffer delay of $n_2$. For example, these particular associated delays may result from the specific buffer sizes which are chosen for use in accumulating the received data packets. (A larger buffer size typically corresponds to a larger associated buffer delay. The advantages of using larger buffer sizes and larger buffer delays are well known to those of ordinary skill in the art and are described above.) Specifically, in accordance with the principles of the present invention, $n_1 > n_2$. In particular, $n_1$ advantageously approximately equals the sum of $n_2$ and $n_d$ (i.e., $n_1 = n_2 + n_d$), where $n_d$ is the delay associated with delay element 14 (on the transmission "side" of communications channel 16) as described above.

Receive buffer 17 and receive buffer 18 are used to provide the input to decoder 21 and decoder 22, respectively. These two decoders correspond to source coders 11 and 12, and are used to generate corresponding reproductions of the original source program from the two data streams $a_1(n)$ and $a_2(n)$, denoted in the figure as $b_1(n)$ and $b_2(n)$, respectively. In particular, decoders 21 and 22 implement conventional decoding of packet-based bit streams, and, in particular, use decoding algorithms which correspond to the encoding algorithms that were used by source coders 11 and 12. (That is, the decoding algorithm implemented by decoder 21 comprises a conventional decoding method for decoding data streams produced by the conventional encoding algorithm implemented by coder 11, and the decoding algorithm implemented by decoder 22 comprises a conventional decoding method for decoding data streams produced by the conventional encoding algorithm implemented by coder 12.) In order to provide accurate and robust decoding of the incoming bit streams, decoders 21 and 22 advantageously delay for a time period equal to $n_1$ and $n_2$, respectively, both after an initial receiver start-up (e.g., when power is applied) and after a receiver "channel" change is effectuated (i.e., the selection of a different broadcast source program), before the corresponding decoding process begins. (As described above, $n_1$ and $n_2$ are the buffer delays associated with buffers 17 and 18, respectively.)

Finally, in accordance with the principles of the present invention as embodied in the illustrative environment of FIG. 1, selection processor 24 operates to produce the resulting reproduction of the original source program, B(n). In particular, this may be done by selecting either the output of decoder 21 or the output of decoder 22 according to the amount of time which has elapsed either since receiver start-up or since a receiver channel change has resulted in the selection of a different broadcast source program. Specifically, the output of decoder 22 is initially selected by selection processor 24 (after delay $n_2$ has elapsed, thereby enabling the proper decoding of bit stream $a_2(n)$), but subsequently—in particular once delay $n_1$ has elapsed (thereby enabling the proper decoding of bit stream $a_1(n)$)— the output of decoder 21 is selected instead. (Recall that in accordance with the illustrative embodiment of the present invention being described herein, $n_1 > n_2$. Thus, delay $n_2$ will elapse before delay $n_1$ has elapsed.) In this manner, a reproduction of the program source, albeit one having somewhat less than the best quality available, is provided after delay $n_2$ has elapsed, but prior to the time when delay $n_1$ has elapsed, thereby at least partially ameliorating the excessive delay that might otherwise be encountered upon either receiver start-up or when a receiver channel change occurs as a result of the selection of a different broadcast source program.

As discussed above, in accordance with certain embodiments of the present invention in which a coding scheme is used in which a higher quality signal is advantageously obtained based upon a combination of the two data streams $a_1(n)$ and $a_2(n)$, decoder 21 may use the outputs of both receive buffer 17 and receive buffer 18 to produce its reproduction of the original source program after delay $n_1$ has elapsed. Alternatively, embodiments employing such coding schemes may allow for the individual decoding of the two data streams $a_1(n)$ and $a_2(n)$ by decoder 21 and decoder 22, respectively, and then combine (e.g., within selection processor 24) these decodings in a conventional manner to produce the higher quality reproduction. Note that in this latter case, selection processor 24 advantageously outputs signal $b_2(n)$ after the delay $n_2$ has elapsed but before the delay $n_1$ has elapsed (recall that $n_1 > n_2$), and then outputs an appropriate combination of signal $b_1(n)$ and signal $b_2(n)$ (i.e., after the delay $n_1$ has elapsed) as its final reproduction of the original source program, B(n).

Figure 2:
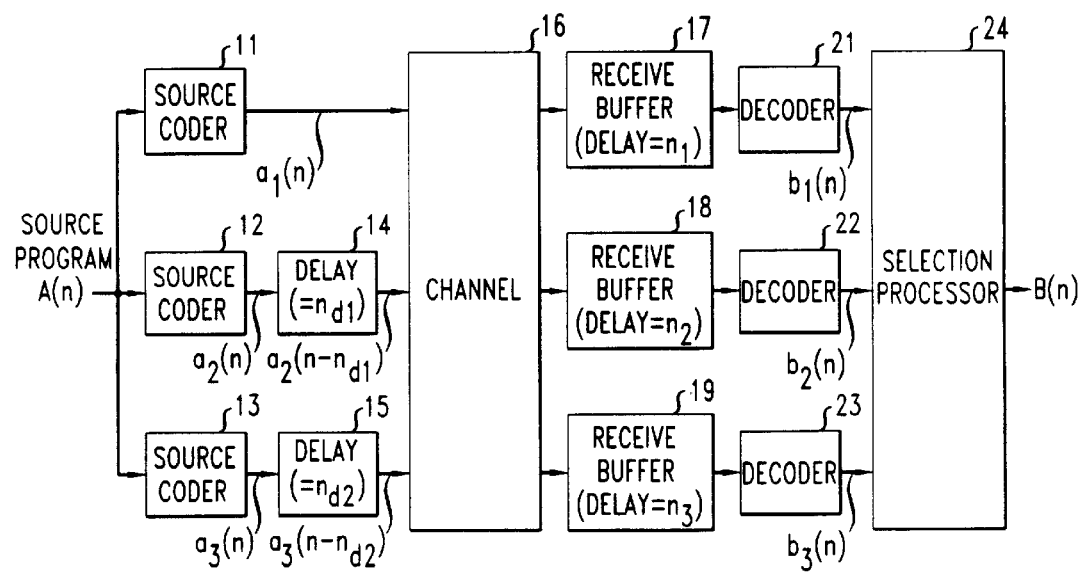
FIG. 2 shows a second illustrative environment for an audio or video streaming application in which the start-up delay for a given program broadcast may be advantageously reduced in accordance with another illustrative embodiment of the present invention.

FIG. 2 shows a second illustrative environment for an audio or video streaming application in which the start-up delay for a given program broadcast may be advantageously reduced in accordance with another illustrative embodiment of the present invention. In particular, the illustrative environment shown in FIG. 2 provides for three (rather than 2) bit streams, which may be used, for example, to produce at least three levels of increasing quality reproduced source program signals, again at the "expense" of increasing the associated decoding delays (and thus, for example, increasing start-up delays). Note, of course, that it will be obvious to those of ordinary skill in the art to extend the principles of the invention to embodiments comprising even more (i.e., four or more) bit streams, thereby producing correspondingly more potential levels of increasing quality reproduced source program signals.

Specifically, the illustrative environment of FIG. 2 adds additional source coder 13, additional delay 15, additional receive buffer 19, and additional decoder 23, to the components shown in FIG. 1 and described above. In particular, the program source, A(n), is encoded by each of source coders 11, 12, and 13 to produce three independent bit streams, $a_1(n)$, $a_2(n)$, and $a_3(n)$, respectively. As in the case of the illustrative environment shown in FIG. 1, each of these source coders may comprise any one of a number of conventional packet-based coders familiar to those of ordinary skill in the art, and as may be used for the coding of, for example, audio or video program data for transmission across a packet-based network such as, for example, the Internet. Further, source coders 11, 12, and 13 may advantageously implement one of a number of various coding schemes, each of which is familiar to those of ordinary skill in the art, designed to provide characteristics analogous to those described above in connection with FIG. 1.

Specifically, signal $a_2(n)$, as generated by source coder 12, and signal $a_3(n)$, as generated by source coder 13, are each delayed prior to transmission (relative to the transmission of signal $a_1(n)$ as generated by source coder 11 as well as relative to each other) by conventional delay elements 14 and 15, respectively. The amount of delay which is applied by delay element 14, $n_{d1}$, is advantageously approximately equal to the difference in the delays incurred by the receive buffers used at the receiver for the decoding of the two data streams, $a_1(n)$ and $a_2(n)$, while the amount of delay which is applied by delay element 15, $n_{d2}$, is advantageously approximately equal to the difference in the delays incurred by the receive buffers used at the receiver for the decoding of the two data streams, $a_1(n)$ and $a_3(n)$. (See the discussion below.) Thus, delay element 14 produces signal $a_2(n-n_{d1})$, namely, signal $a_2(n)$ delayed by an amount of time $n_{d1}$, while delay element 15 produces signal $a_3(n-n_{d2})$, namely, signal $a_3(n)$ delayed by an amount of time $n_{d2}$. Note that advantageously, $n_{d1} < n_{d2}$.

In accordance with the illustrative embodiment of FIG. 2, the receiving end of channel 16 comprises three receive buffers—receive buffers 17, 18, and 19. Receive buffer 17 is adapted to receive the data stream which was transmitted as $a_1(n)$, receive buffer 18 is adapted to receive the data stream which was transmitted as $a_2(n)$, and receive buffer 19 is adapted to receive the data stream which was transmitted as $a_3(n)$. Advantageously, receive buffer 17 has an associated buffer delay of $n_1$, receive buffer 18 has an associated buffer delay of $n_2$, and receive buffer 19 has an associated buffer delay of $n_3$, specifically wherein $n_1 > n_2 > n_3$. In particular, $n_1$ advantageously approximately equals the sum of $n_2$ and $n_{d1}$ (i.e., $n_1 = n_2 + n_{d1}$), where $n_{d1}$ is the delay associated with delay element 14 described above. Similarly, $n_1$ advantageously approximately equals the sum of $n_3$ and $n_{d2}$ (i.e., $n_1 = n_3 + n_{d2}$), where $n_{d2}$ is the delay associated with delay element 15 described above.

Receive buffers 17, 18, and 19 are used to provide the input to decoders 21, 22, and 23, respectively. These three decoders correspond to source coders 11, 12, and 13, and are used to generate corresponding reproductions of the original source program from the three data streams $a_1(n)$, $a_2(n)$, and $a_3(n)$, denoted in the figure as $b_1(n)$, $b_2(n)$, and $b_3(n)$, respectively. In particular, decoders 21, 22, and 23 implement conventional decoding of packet-based bit streams, and, in particular, use decoding algorithms which correspond to the encoding algorithms that were used by source coders 11, 12, and 13.

Finally, in accordance with the principles of the present invention as embodied in the illustrative environment of FIG. 2, selection processor 24 operates to produce the resulting reproduction of the original source program, B(n), by selecting the output of either decoder 21, decoder 22, or decoder 23, according to the amount of time which has elapsed either since receiver start-up or since a receiver channel change has resulted in the selection of a different broadcast source program. Specifically, in this case, the output of decoder 23 is initially selected (after delay $n_3$ has elapsed, thereby enabling the proper decoding of bit stream $a_3(n)$). Once delay $n_2$ has elapsed (thereby enabling the proper decoding of bit stream $a_2(n)$), the output of decoder 22 may be advantageously selected instead. And finally, once delay $n_1$ has elapsed (thereby enabling the proper decoding of bit stream $a_1(n)$), the output of decoder 21 may be advantageously selected to provide the highest quality reproduction of the original source program. (Recall that in accordance with the illustrative embodiment of the present invention being described herein, $n_1 > n_2 > n_3$.) In this manner, a hierarchical sequence of reproductions of the program source, each having somewhat better quality than the one provided before it, may be advantageously provided after a sufficient corresponding delay has elapsed.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in a computer readable medium and so executed by a computer or processor, whether or not such computer or processor is explicitly shown.

The functions of the various elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function, or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method of processing two or more sequences of data packets received from a network, each of said sequences of data packets representing a common program source, the method comprising the steps of:

buffering data packets comprised in a first one of said sequences in a first receive buffer having a first buffering delay;

buffering data packets comprised in a second one of said sequences in a second receive buffer having a second buffering delay, wherein said second buffering delay is smaller than said first buffering delay;

decoding the data packets buffered in said second receive buffer after said second buffering delay has elapsed;

decoding the data packets buffered in said first receive buffer after said first buffering delay has elapsed;

generating a reproduction of said program source based at least upon the decoding of the data packets buffered in said second receive buffer before said first buffering delay has elapsed, and based at least upon the decoding of the data packets buffered in said first receive buffer after said first buffering delay has elapsed.

2. The method of claim 1 wherein said network comprises the Internet.

3. The method of claim 1 wherein said program source comprises an audio program.

4. The method of claim 1 wherein said program source comprises a video program.

5. The method of claim 1 wherein the first sequence of data packets and the second sequence of data packets have been transmitted onto the network from a source location, the transmission of the second sequence of data packets having been delayed relative to the transmission of the first sequence of data packets by a given relative transmission delay.

6. The method of claim 5 wherein the given relative transmission delay is approximately equal to the difference between the first buffering delay and the second buffering delay.

7. The method of claim 1 wherein the first receive buffer has a first buffer size and the second receive buffer has a second buffer size, the mathematical ratio of the first buffer size to the second buffer size being approximately equal to the mathematical ratio of the first buffering delay to the second buffering delay.

8. The method of claim 1 wherein the program source is encoded with a multiple descriptive source coder which generates two or more individual bit streams, the second sequence of data packets comprising one of said individual bit streams and the first sequence of data packets comprising at least another one of said individual bit streams.

9. The method of claim 1 wherein the program source is encoded with an embedded coder which generates a core layer and one or more enhancement layers, the second sequence of data packets comprising an encoding of said core layer and the first sequence of data packets comprising at least an encoding of one or more of said one or more enhancement layers.

10. The method of claim 1 wherein the first sequence of data packets comprises an encoding of the common program source having a first bit rate, and the second sequence of data packets comprises an encoding of the common program source having a second bit rate, the mathematical ratio of the first bit rate to the second bit rate being approximately equal to the mathematical ratio of the first buffering delay to the second buffering delay.

11. An apparatus for processing two or more sequences of data packets received from a network, each of said sequences of data packets representing a common program source, the apparatus comprising:

a first receive buffer having a first buffer delay for buffering data packets comprised in a first one of said sequences;

a second receive buffer having a second buffering delay for buffering data packets comprised in a second one of said sequences, wherein said second buffering delay is smaller than said first buffering delay;

a decoder for decoding the data packets buffered in said second receive buffer after said second buffering delay has elapsed and for decoding the data packets buffered in said first receive buffer after said first buffering delay has elapsed;

a signal generator for generating a reproduction of said program source based at least upon the decoding of the data packets buffered in said second receive buffer before said first buffering delay has elapsed, and based at least upon the decoding of the data packets buffered in said first receive buffer after said first buffering delay has elapsed.

12. The apparatus of claim 11 wherein said network comprises the Internet.

13. The apparatus of claim 11 wherein said program source comprises an audio program.

14. The apparatus of claim 11 wherein said program source comprises a video program.

15. The apparatus of claim 11 wherein the first sequence of data packets and the second sequence of data packets have been transmitted onto the network from a source location, the transmission of the second sequence of data packets having been delayed relative to the transmission of the first sequence of data packets by a given relative transmission delay.

16. The apparatus of claim 15 wherein the given relative transmission delay is approximately equal to the difference between the first buffering delay and the second buffering delay.

17. The apparatus of claim 11 wherein the first receive buffer has a first buffer size and the second receive buffer has a second buffer size, the mathematical ratio of the first buffer size to the second buffer size being approximately equal to the mathematical ratio of the first buffering delay to the second buffering delay.

18. The apparatus of claim 11 wherein the program source is encoded with a multiple descriptive source coder which generates two or more individual bit streams, the second sequence of data packets comprising one of said individual bit streams and the first sequence of data packets comprising at least another one of said individual bit streams.

19. The apparatus of claim 11 wherein the program source is encoded with an embedded coder which generates a core layer and one or more enhancement layers, the second sequence of data packets comprising an encoding of said core layer and the first sequence of data packets comprising at least an encoding of one or more of said one or more enhancement layers.

20. The apparatus of claim 11 wherein the first sequence of data packets comprises an encoding of the common program source having a first bit rate and the second sequence of data packets comprises an encoding of the common program source having a second bit rate, the mathematical ratio of the first bit rate to the second bit rate being approximately equal to the mathematical ratio of the first buffering delay to the second buffering delay.

* * * * *